US009201239B1

(12) United States Patent
Fu (10) Patent No.: US 9,201,239 B1
(45) Date of Patent: Dec. 1, 2015

(54) TWO-DIMENSIONAL ELECTROSTATIC SCANNER WITH DISTRIBUTED SPRINGS (71) Applicant: Yee-Chung Fu, Fremont, CA (US)

(72) Inventor: Yee-Chung Fu, Fremont, CA (US)

(73) Assignee: ADVANCED NUMICRO SYSTEMS, INC., Fremont, CA (US)

( * ) Notice: Subject to any disclaimer, the term of this patent is extended or adjusted under 35 U.S.C. 154(b) by 46 days.

(21) Appl. No.: 14/201,668

(22) Filed: Mar. 7, 2014

(51) Int. Cl.
G02B 26/08 (2006.01)
G02B 26/10 (2006.01)

(52) U.S. Cl.
CPC .......... G02B 26/101 (2013.01); G02B 26/0841 (2013.01)

(58) Field of Classification Search
None
See application file for complete search history.

(56) References Cited

U.S. PATENT DOCUMENTS

| 6,819,822 | B2 | 11/2004 | Behin et al. | |
|---|---|---|---|---|
| 7,014,115 | B2 | 3/2006 | Fu | |
| 7,459,093 | B1* | 12/2008 | Fu | 216/2 |
| 7,538,927 | B1 | 5/2009 | Fu | |
| 7,796,315 | B1 | 9/2010 | Fu | |
| 2005/0184351 | A1* | 8/2005 | Fu | 257/415 |
| 2005/0219677 | A1* | 10/2005 | Krylov | G02B 26/0841 359/245 |
| 2007/0053044 | A1* | 3/2007 | Kawakami | G02B 26/0841 359/199.2 |
| 2009/0284816 | A1* | 11/2009 | Davis | G02B 26/0841 359/199.1 |
| 2010/0085622 | A1* | 4/2010 | Hofmann | G02B 26/0841 359/221.2 |
| 2010/0103492 | A1* | 4/2010 | Maruyama | G02B 26/0841 359/200.6 |
| 2010/0232833 | A1* | 9/2010 | Fujii et al. | G02B 26/105 399/130 |
| 2014/0198366 | A1* | 7/2014 | Carminati | G02B 26/105 359/212.2 |
| 2014/0300942 | A1* | 10/2014 | Van Lierop | G02B 26/0841 359/199.2 |

* cited by examiner

Primary Examiner — Charlie Y Peng
(74) Attorney, Agent, or Firm — Chen-Chi Lin (57) ABSTRACT A two-dimensional electrostatic scanner with distributed springs is disclosed. The two-dimensional electrostatic scanner comprises a frame, a mirror, one or more first-directional comb drives, two or more second-directional comb drives, four or more first-directional springs, and two or more second-directional springs. The four or more first-directional springs may connect to different electrical voltage source or electrical ground.

22 Claims, 10 Drawing Sheets

TWO-DIMENSIONAL ELECTROSTATIC SCANNER WITH DISTRIBUTED SPRINGS

FIELD OF THE INVENTION

This invention relates to Micro-Electro Mechanical Systems (MEMS). More particularly, the present invention relates to a two-dimensional electrostatic scanner.

BACKGROUND OF THE INVENTION

FIG. 3 of U.S. Pat. No. 6,819,822 to Behin et al. discloses a two-dimensional scanning actuator with one spring at each side of the mirror. FIG. 29A of U.S. Pat. No. 7,796,315 to Fu discloses a two-dimensional scanning mirror with distributed springs. The springs on one side of the mirror are electrically connected. The springs on the other side of the mirror are electrically connected. The two-dimensional scanning mirror is not symmetric with respect to the rotation axes. FIG. 1A of U.S. Pat. No. 7,014,115 to Fu discloses a one-dimensional MEMS scanning mirror with distributed hinges that are electrically connected. FIG. 1A, 1B, 1C, 2, 3, and 4 of U.S. Pat. No. 7,538,927 to Fu discloses a process to construct a scanning mirror with short vertical combteeth in a vertical comb drive and long in-plane combteeth in a in-plane comb drive.

SUMMARY OF THE INVENTION

The present invention relates to a two-dimensional electrostatic scanner with distributed springs. The two-dimensional electrostatic scanner comprises a frame, a mirror, one or more first-directional comb drives, two or more second-directional comb drives, four or more first-directional springs, and two or more second-directional springs. The four or more first-directional springs may connect to different electrical voltage source or electrical ground.

The two-dimensional electrostatic scanner of the present invention may be for use in a pico projector, a mobile projector, a two-dimensional scanning actuator, or an optical switch. Discussion of the specific applications is illustrative and not intended to limit the scope of the present invention.

DETAILED DESCRIPTION OF THE INVENTION

Figure 1A:
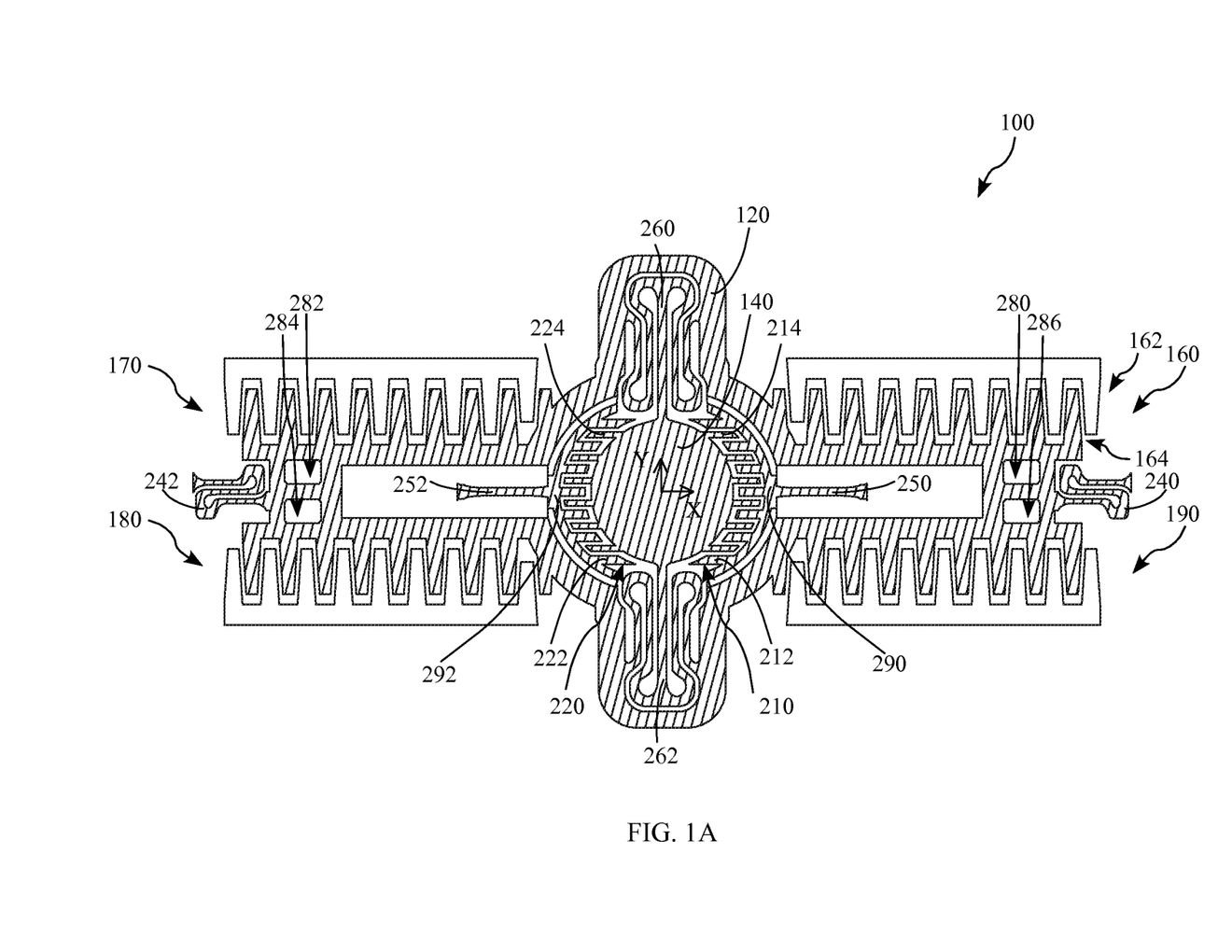
FIG. 1A shows a top view of a two-dimensional electrostatic scanner configured in accordance with one embodiment of the present invention.

FIG. 1A shows a two-dimensional electrostatic scanner 100 configured in accordance with one embodiment of the present invention. The scanner 100 comprises a frame 120 to rotate about a first direction (X-axis), a mirror 140 to rotate about a second direction (Y-axis), one or more first-directional comb drives (For example, four comb drives 160, 170, 180, and 190 are shown.), two or more second-directional comb drives (For example, two comb drives 210 and 220 are shown.), four or more first-directional springs (For example, four springs 240, 242, 250, and 252 are shown.), and two or more second-directional springs (For example, two springs 260 and 262 are shown.). The one or more first-directional comb drives (For example, four comb drives 160, 170, 180, and 190 are shown.) includes a first first-directional comb drive 160. The first first-directional comb drive 160 contains a first fixed combteeth set 162 and a first first-directionally movable combteeth set 164. The first first-directionally movable combteeth set 164 is to rotate about the first direction (X-axis). The first first-directionally movable combteeth set 164 is directly attached to the frame 120. The first first-directionally movable combteeth set 164 is electrically connected to the frame 120. The two or more second-directional comb drives (For example, two comb drives 210 and 220 are shown.) includes a first second-directional comb drive 210 and a second second-directional comb drive 220. The first second-directional comb drive 210 contains a first relatively stationary combteeth set 212 (It may rotate about the X-axis and may not rotate about the Y-axis) and a first second-directionally movable combteeth set 214. The first second-directionally movable combteeth set 214 is to rotate about the second direction (Y-axis). The first second-directionally movable combteeth set 214 is directly attached to the mirror 140. The first second-directionally movable combteeth set 214 is electrically connected to the mirror 140. The second second-directional comb drive 220 contains a second relatively stationary combteeth set 222 and a second second-directionally movable combteeth set 224. The second second-directionally movable combteeth set 224 is to rotate about the second direction (Y-axis). The second second-directionally movable combteeth set 224 is directly attached to the mirror 140. The second second-directionally movable combteeth set 224 is electrically connected to the mirror 140. The four or more first-directional springs (For example, four springs 240, 242, 250, and 252 are shown.) are to rotate about the first direction (X-axis). The four or more first-directional springs (For example, four springs 240, 242, 250, and 252 are shown.) align along the first direction (X-axis) and includes a first outer spring 240, a second outer spring 242, a first inner spring 250, and a second inner spring 252. The first 240 and the second 242 outer springs each have a first end connected to the frame 120. The first inner spring 250 is electrically connected to the first relatively stationary combteeth set 212 (For example, through a first link member 290). The first inner spring 250 is indirectly attached to the first relatively stationary combteeth set 212 (For example, through the first link member 290). The second inner spring 252 is electrically connected to the second relatively stationary combteeth set 222 (For example, through a second link member 292). The second inner spring 252 is indirectly attached to the second relatively stationary combteeth set 222 (For example, through the second link member 292). The two or more second-directional springs (For example, two springs 260 and 262 are shown.) are to rotate about the second direction (Y-axis). The two or more second-directional springs (For example, two springs 260 and 262 are shown.) align along the second direction (Y-axis). The mirror 140 and the frame 120 are interconnected with the two or more second-directional springs (For example, two springs 260 and 262 are shown.). The first inner spring 250 is located between the first outer spring 240 and the mirror 140. The second inner spring 252 is located between the second outer spring 242 and the mirror 140.

In a more detailed embodiment, the mirror 140, the two or more second-directional springs (For example, two springs 260 and 262 are shown.), the frame 120, the first 240 and second 242 outer springs, the first first-directionally movable combteeth set 164, and the first 214 and second 224 second-directionally movable combteeth set are electrically connected to ground.

In one embodiment, the one or more first-directional comb drives (For example, four comb drives 160, 170, 180, and 190 are shown.) are vertical comb drives. The rotated position of the frame 120 is adjusted in response to a capacitance value measured between the first fixed combteeth set 162 and the first first-directionally movable combteeth set 164. In another embodiment, the rotated position of the frame 120 is adjusted in response to a capacitance value of the comb drive 160 and 170. In still another embodiment, the rotated position of the frame 120 is adjusted in response to a capacitance value of the comb drive 180 and 190.

In one embodiment, the two or more second-directional comb drives (For example, two comb drives 210 and 220 are shown.) are in-plane comb drives. The mirror 140 has a second-directionally rotational resonance frequency with a mode shape to rotate about the second direction (Y-axis) and the mirror was driven to rotate back and forth about the second direction (Y-axis) at a frequency close to the second-directionally rotational resonance frequency.

In one embodiment, the two-dimensional electrostatic scanner of FIG. 1A further comprises a base (not shown). The first outer spring 240 has a second end connected to the base; the second outer spring 242 has a second end connected to the base; the first inner spring 250 has a first end connected to the base; and the second inner spring 252 has a first end connected to the base.

In one embodiment, the two-dimensional electrostatic scanner of FIG. 1A further comprises a first anchor (not shown), a second anchor (not shown), a third anchor (not shown), and a fourth anchor (not shown). The first outer spring 240 has a second end connected to the first anchor; the second outer spring 242 has a second end connected to the second anchor; the first inner spring 250 has a first end connected to the third anchor; and the second inner spring 252 has a first end connected to the fourth anchor.

In one embodiment, the frame 120 has openings (For example, four openings 280, 282, 284, and 286 are shown.) near the first 240 or the second 242 outer springs.

In one embodiment, the two-dimensional electrostatic scanner of FIG. 1A has a second-directionally rotational resonance frequency with a mode shape to rotate about the second direction (Y-axis) and a third-directionally rotational resonance frequency with a mode shape to rotate about the third direction (Z-axis, not shown). The third-directionally rotational resonance frequency is between eighty-five percent and ninety-nine percent of the second-directionally rotational resonance frequency. For example, the second-directionally rotational resonance frequency is at 24,000 Hz and the third-directionally rotational resonance frequency is at 22,500 Hz.

In one embodiment, the combteeth may be of rectangular prism shape. In another embodiment, the combteeth may be of tapered shape.

In one embodiment, the components shown with hatched lines in FIG. 1A may be fabricated from a first layer of a wafer. The frame 120, the mirror 140, the first first-directionally movable combteeth set 164, two or more second-directional comb drives (For example, two comb drives 210 and 220 are shown.), four or more first-directional springs (For example, four springs 240, 242, 250, and 252 are shown.), and two or more second-directional springs (For example, two springs 260 and 262 are shown.) may be fabricated from the first layer of the wafer. In one embodiment, those components may have the same thickness. In another embodiment, those components may have different thickness. For example, in FIG. 1B, a recess 360 may be formed in the backside of the mirror 140 through an etching process.

In one embodiment, the two-dimensional electrostatic scanner 100 is symmetric with respect to the second direction (Y-axis). In one embodiment, the first outer spring 240 and the second outer spring 242 are not symmetric with respect to the first direction (X-axis). The two-dimensional electrostatic scanner 100 may be symmetric with respect to the first direction (X-axis) if the first outer spring 240 and the second outer spring 242 are replaced with springs that are symmetric with respect to the first direction (X-axis).

Figure 1B:
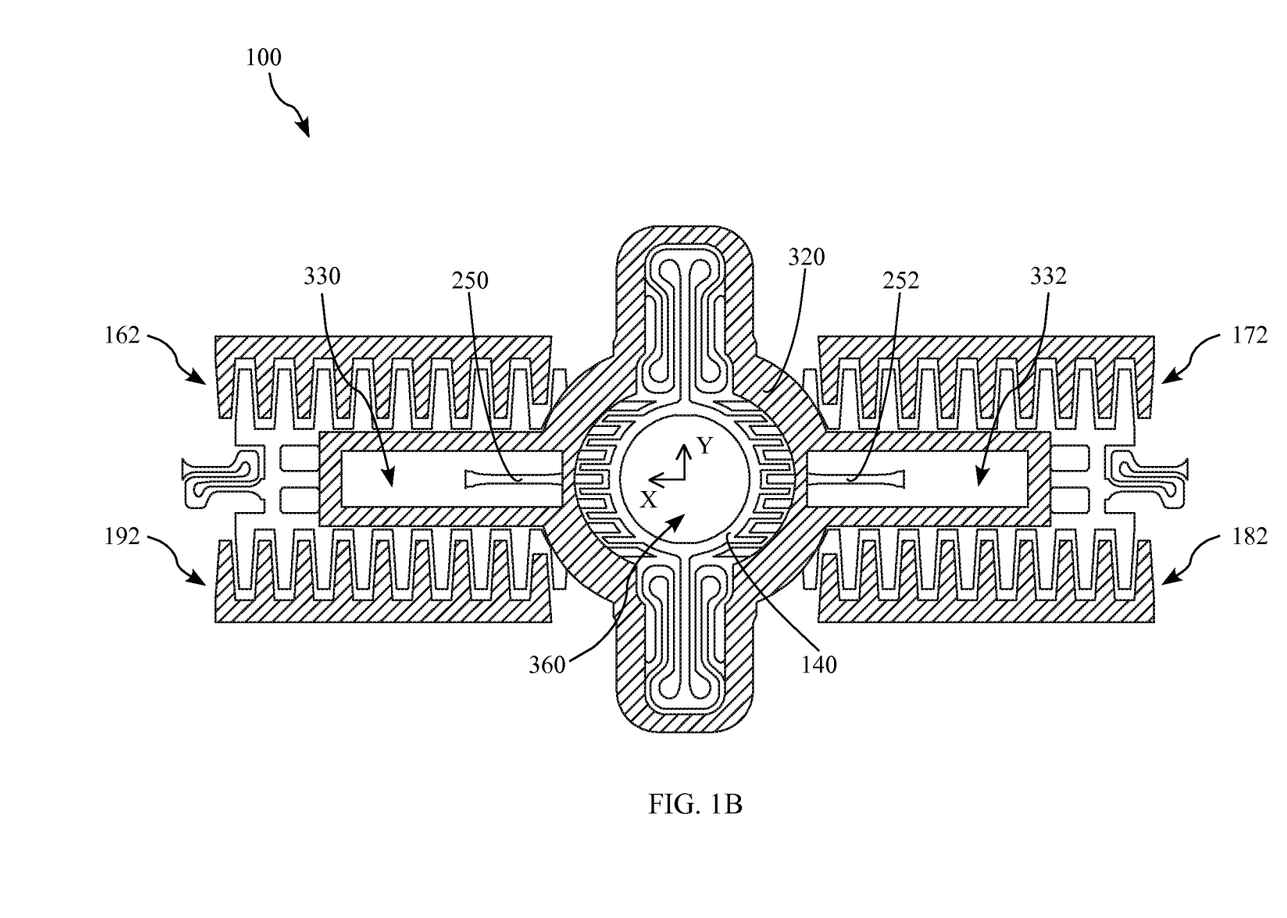
FIG. 1B shows the bottom view of the two-dimensional electrostatic scanner of FIG. 1A.

In one embodiment, the two-dimensional electrostatic scanner 100 further comprises a first link member 290 and a second link member 292 (see FIG. 1A). The first link member 290 mechanically interconnects the first inner spring 250 and the first relatively stationary combteeth set 212. The second link member 292 mechanically inter connects the second inner spring 252 and the second relatively stationary combteeth set 222. The first link member 290 has a first link member bottom surface (not shown). The second link member 292 has a second link member bottom surface (not shown). The frame 120 has a frame bottom surface (not shown). FIG. 1B shows the bottom view of the two-dimensional electrostatic scanner of FIG. 1A. The two-dimensional electrostatic scanner 100 further comprises an integration ring 320. The integration ring 320 has a top ring surface (not shown). One portion of the top ring surface (the portion directly under the first link member 290) is bonded to a portion of the first link member bottom surface; another portion of the top ring surface (the portion directly under the second link member 292) is bonded to a portion of the second link member bottom surface; and still another portion of the top ring surface (the portion directly under the frame 120) is bonded to a portion of the frame bottom surface.

In one embodiment, the integration ring 320 has a first opening 330 and a second opening 332 (See FIG. 1B). The first inner spring 250 is located above the first opening 330 and the second inner spring 252 is located above the second opening 332.

In one embodiment, the components shown with hatched lines in FIG. 1B may be fabricated from a second layer and a third layer of a wafer. For example, four fixed combteeth set 162, 172, 182, and 192 are shown in FIG. 1B. The fixed combteeth sets 162, 172, 182, and 192 and the integration ring 320 may be fabricated from the second layer and the third layer of the wafer. The integration ring 320 may include a top layer (the second layer of the wafer) and a bottom layer (the third layer of the wafer). The top layer may be an electrical insulation layer. In one embodiment, the electrical insulation layer is made of silicon oxide. In one embodiment, the four fixed combteeth set 162, 172, 182, and 192 may include a top layer (the second layer of the wafer) and a bottom layer (the third layer of the wafer). In another embodiment, the four fixed combteeth set 162, 172, 182, and 192 may only include a bottom layer (the third layer of the wafer) after the top layer (the second layer of the wafer) is removed by a process.

Figure 2A:
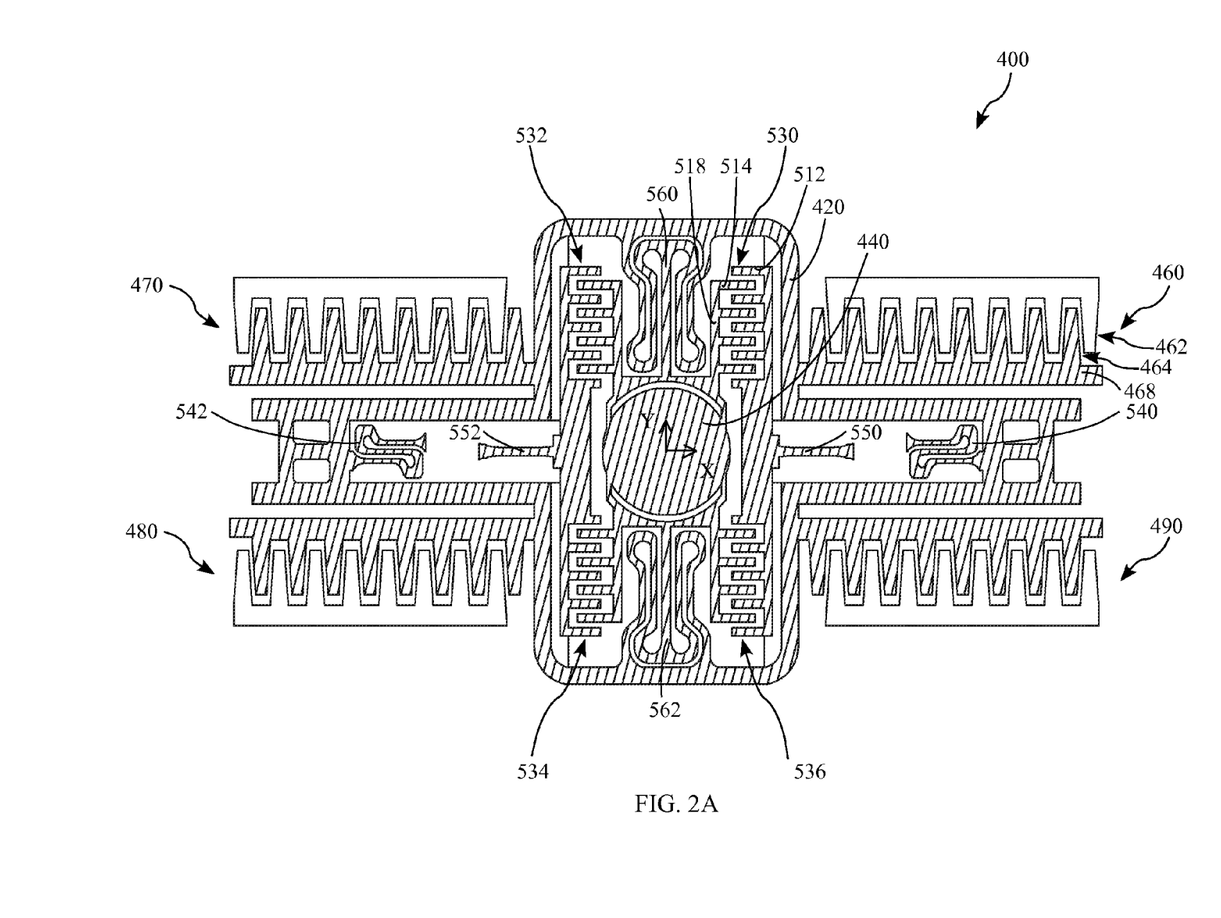
FIG. 2A shows a top view of a two-dimensional electrostatic scanner configured in accordance with another embodiment of the present invention.

FIG. 2A shows a two-dimensional electrostatic scanner 400 configured in accordance with another embodiment of the present invention. The scanner 400 comprises a frame 420 to rotate about a first direction (X-axis), a mirror 440 to rotate about a second direction (Y-axis), one or more first-directional comb drives (For example, four comb drives 460, 470, 480, and 490 are shown.), two or more second-directional comb drives (For example, four comb drives 530, 532, 534, and 536 are shown.), four or more first-directional springs (For example, first outer spring 540, second outer spring 542, first inner spring 550, and second inner spring 552 are shown.), and two or more second-directional springs (For example, two springs 560 and 562 are shown.). The one or more first-directional comb drives (For example, four comb drives 460, 470, 480, and 490 are shown.) includes a first first-directional comb drive 460. The first first-directional comb drive 460 contains a first fixed combteeth set 462 and a first first-directionally movable combteeth set 464. The first first-directionally movable combteeth set 464 is to rotate about the first direction (X-axis). The first first-directionally movable combteeth set 464 is indirectly attached to the frame 420 (For example, the first first-directionally movable combteeth set 464 is directly attached to a first first-directional support member 468 and the first first-directional support member 468 is directly attached to the frame 420). The first first-directionally movable combteeth set 464 is electrically connected to the frame 420. The two or more second-directional comb drives (For example, four comb drives 530, 532, 534, and 536 are shown.) includes a first second-directional comb drive 530. The first second-directional comb drive 530 contains a first relatively stationary combteeth set 512 and a first second-directionally movable combteeth set 514. The first second-directionally movable combteeth set 514 is to rotate about the second direction (Y-axis). The first second-directionally movable combteeth set 514 is indirectly attached to the mirror 540 (For example, the first second-directionally movable combteeth set 514 is directly attached to a first second-directional support member 518 and the first second-directional support member 518 is directly attached to the mirror 440). The first second-directionally movable combteeth set 514 is electrically connected to the mirror 440. In one embodiment, the components shown with hatched lines in FIG. 2A may be fabricated from a first layer of a wafer.

Figure 2B:
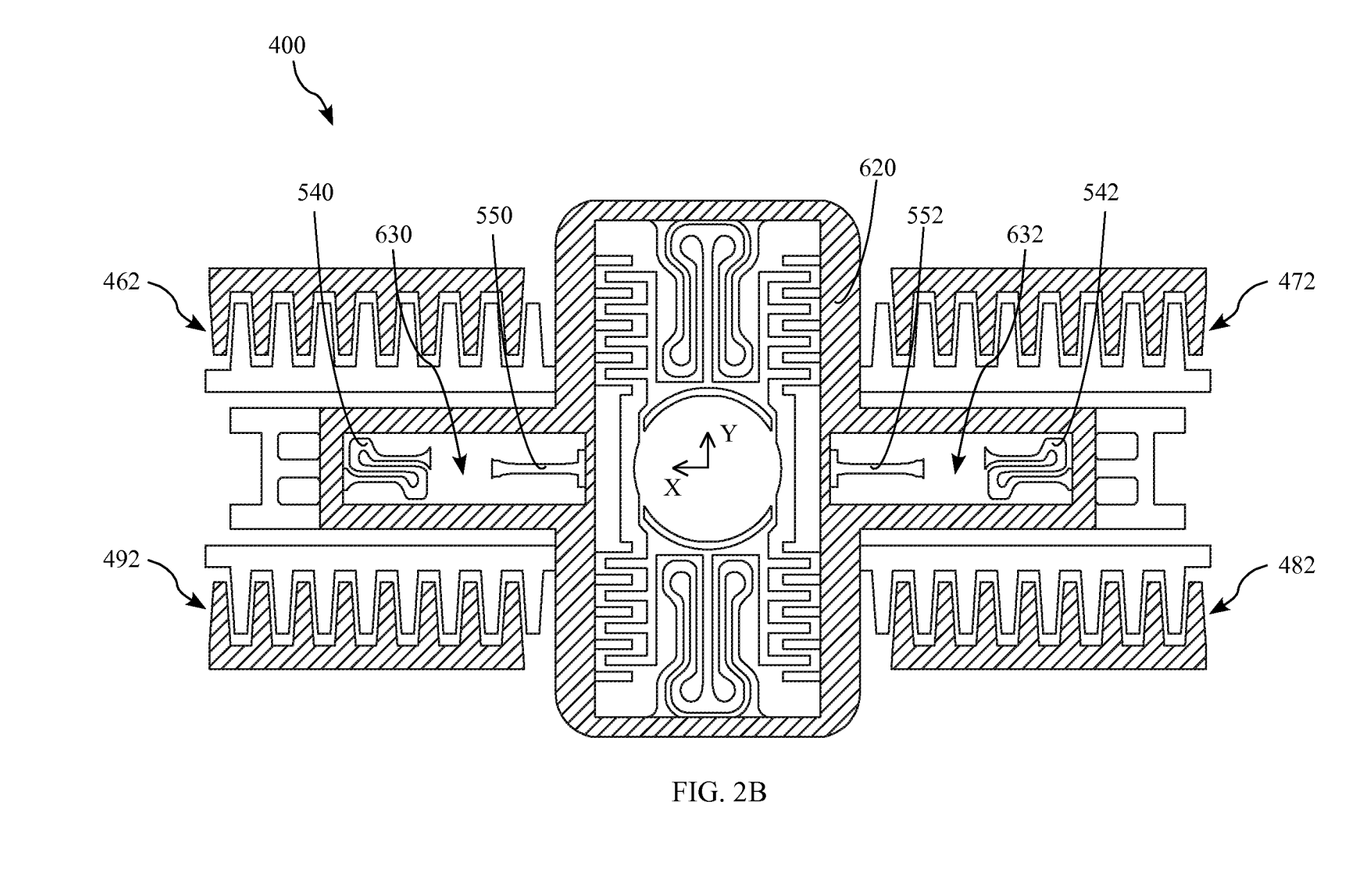
FIG. 2B shows the bottom view of the two-dimensional electrostatic scanner of FIG. 2A.

FIG. 2B shows the bottom view of the two-dimensional electrostatic scanner of FIG. 2A. The two-dimensional electrostatic scanner 400 further comprises an integration ring 620. In one embodiment, the integration ring 620 has a first opening 630 and a second opening 632. The first outer spring 540 and the first inner spring 550 are located above the first opening 630 and the second outer spring 542 and the second inner spring 552 are located above the second opening 632. In one embodiment, the components shown with hatched lines in FIG. 2B may be fabricated from a second layer and a third layer of a wafer. For example, four fixed combteeth set 462, 472, 482, and 492 are shown in FIG. 2B. The fixed combteeth sets 462, 472, 482, and 492 and the integration ring 620 may be fabricated from the second layer and the third layer of the wafer.

Figure 3A:
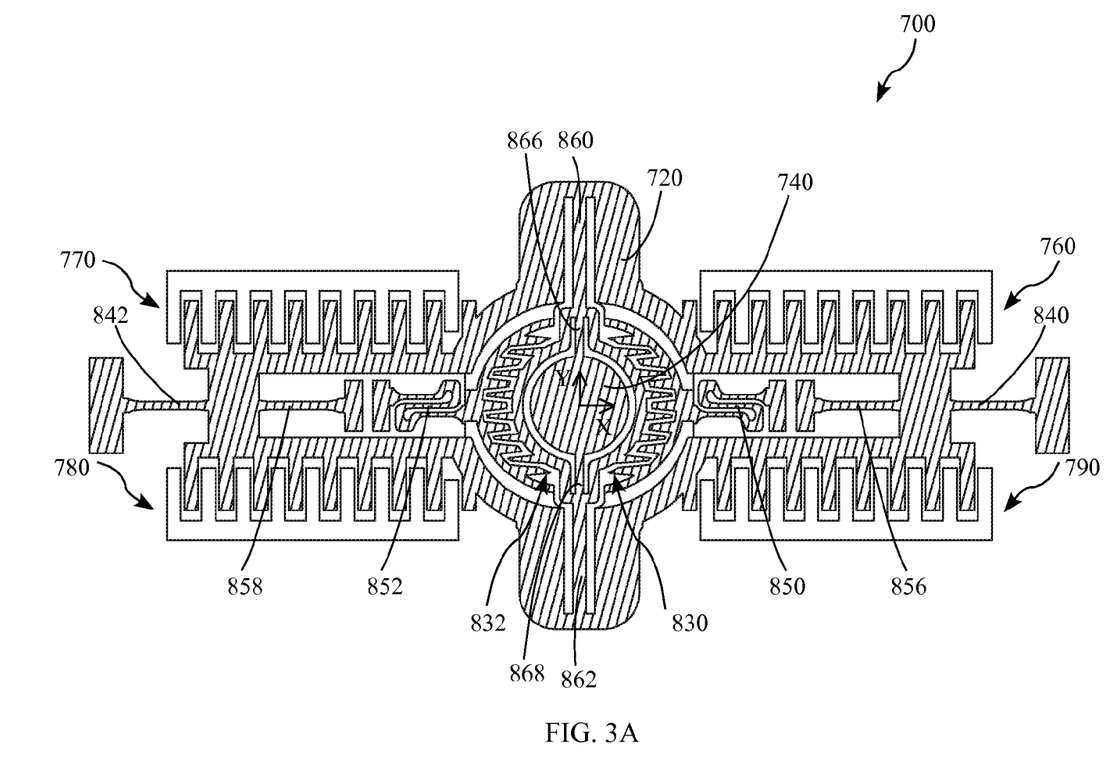
FIG. 3A shows a top view of a two-dimensional electrostatic scanner configured in accordance with still another embodiment of the present invention.

FIG. 3A shows a two-dimensional electrostatic scanner 700 configured in accordance with still another embodiment of the present invention. The scanner 700 comprises a frame 720 to rotate about a first direction (X-axis), a mirror 740 to rotate about a second direction (Y-axis), one or more first-directional comb drives (For example, four comb drives 760, 770, 780, and 790 are shown.), two or more second-directional comb drives (For example, two comb drives 830 and 832 are shown.), four or more first-directional springs (For example, first outer spring 840, second outer spring 842, first inner spring 850, second inner spring 852, first middle spring 856, and second middle spring 858 are shown.), and two or more second-directional springs (For example, four springs 860, 862, 866, and 868 are shown.). In one embodiment, the components shown with hatched lines in FIG. 3A may be fabricated from a first layer of a wafer.

Figure 3B:
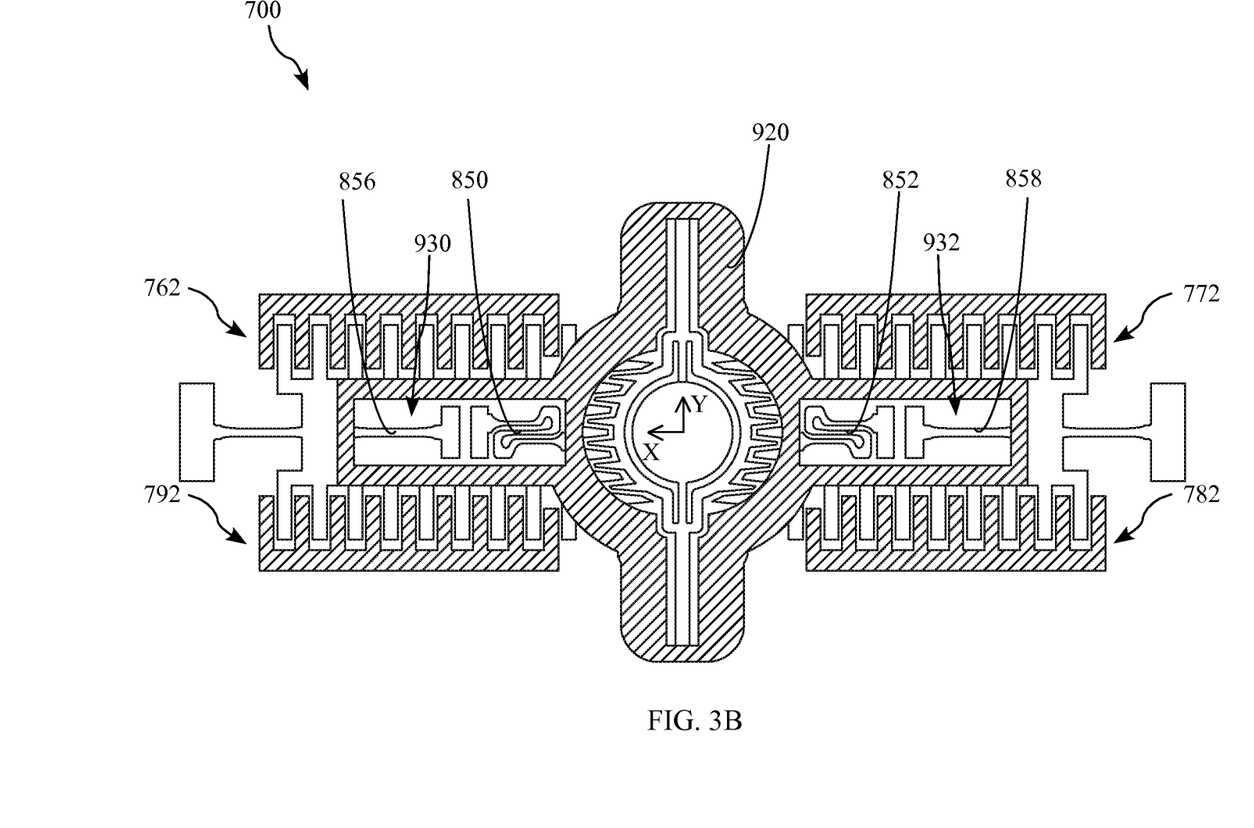
FIG. 3B shows the bottom view of the two-dimensional electrostatic scanner of FIG. 3A.

FIG. 3B shows the bottom view of the two-dimensional electrostatic scanner of FIG. 3A. The two-dimensional electrostatic scanner 700 further comprises an integration ring 920. In one embodiment, the integration ring 920 has a first opening 930 and a second opening 932. The first middle spring 856 and the first inner spring 850 are located above the first opening 930 and the second middle spring 858 and the second inner spring 852 are located above the second opening 932. In one embodiment, the components shown with hatched lines in FIG. 3B may be fabricated from a second layer and a third layer of a wafer. For example, four fixed combteeth set 762, 772, 782, and 792 are shown in FIG. 3B. The fixed combteeth sets 762, 772, 782, and 792 and the integration ring 920 may be fabricated from the second layer and the third layer of the wafer.

Figure 4A:
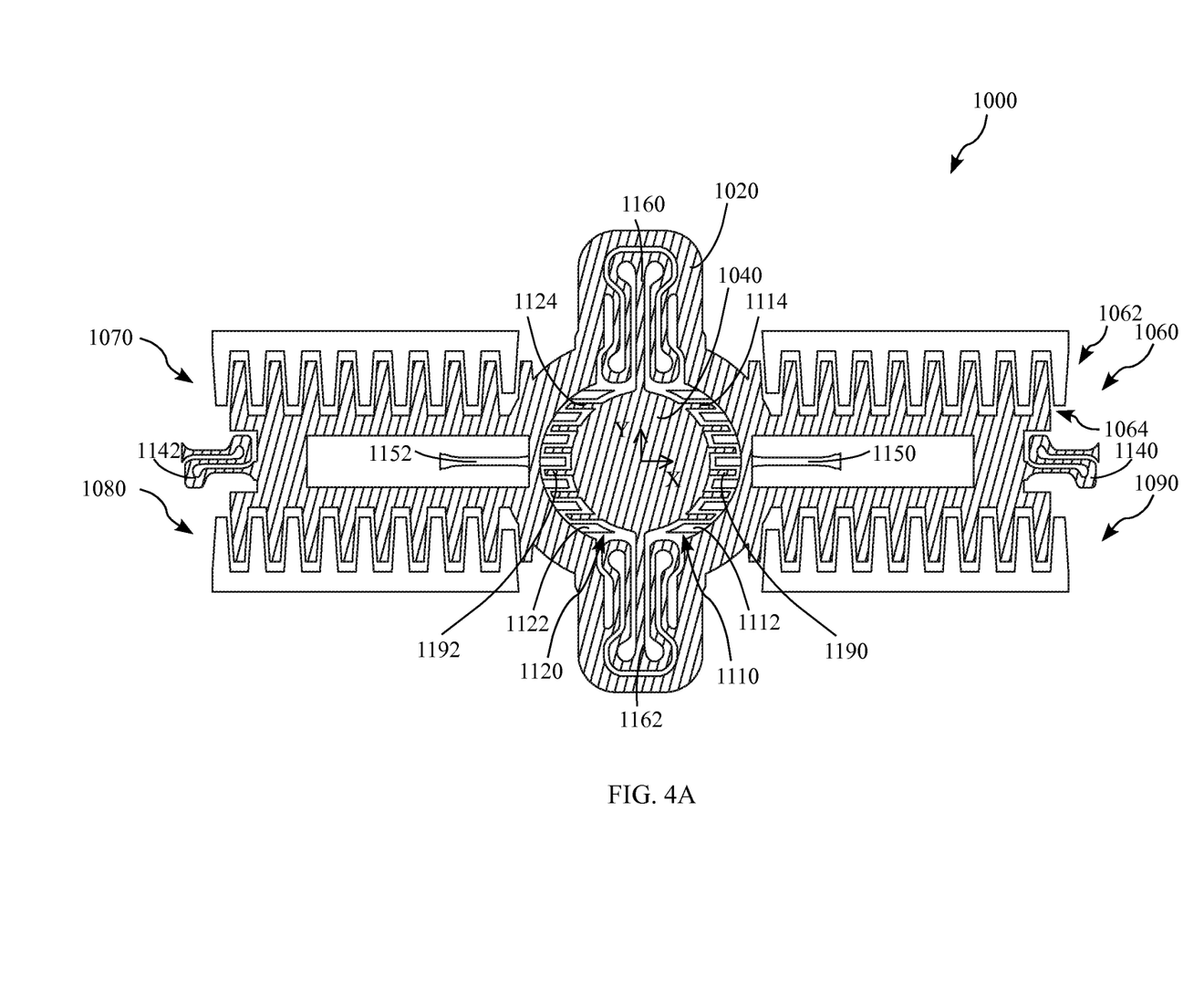
FIG. 4A shows a top view of a two-dimensional electrostatic scanner configured in accordance with yet another embodiment of the present invention.

FIG. 4A shows a two-dimensional electrostatic scanner (switch) 1000 configured in accordance with yet another embodiment of the present invention. The scanner (switch) 1000 comprises a frame 1020 to rotate about a first direction (X-axis), a mirror 1040 to rotate about a second direction (Y-axis), one or more first-directional comb drives (For example, four comb drives 1060, 1070, 1080, and 1090 are shown.), two or more second-directional comb drives (For example, two comb drives 1110 and 1120 are shown.), four or more first-directional springs (For example, first outer spring 1140, second outer spring 1142, first inner spring 1150, and second inner spring 1152 are shown.), and two or more second-directional springs (For example, two springs 1160 and 1162 are shown.). The one or more first-directional comb drives (For example, four comb drives 1060, 1070, 1080, and 1090 are shown.) includes a first first-directional comb drive 1060. The first first-directional comb drive 1060 contains a first fixed combteeth set 1062 and a first first-directionally movable combteeth set 1064. The first first-directionally movable combteeth set 1064 is to rotate about the first direction (X-axis). The first first-directionally movable combteeth set 1064 is directly attached to the frame 1020. The first first-directionally movable combteeth set 1064 is electrically connected to the frame 1020. The two or more second-directional comb drives (For example, two comb drives 1110 and 1120 are shown.) includes a first second-directional comb drive 1110 and a second second-directional comb drive 1120. The first second-directional comb drive 1110 contains a first relatively stationary combteeth set 1112 (It may rotate about the X-axis and may not rotate about the Y-axis) and a first second-directionally movable combteeth set 1114. The first second-directionally movable combteeth set 1114 is to rotate about the second direction (Y-axis). The first second-directionally movable combteeth set 1114 is directly attached to the mirror 1040. The first second-directionally movable combteeth set 1114 is electrically connected to the mirror 1040. The second second-directional comb drive 1120 contains a second relatively stationary combteeth set 1122 and a second second-directionally movable combteeth set 1124. The second second-directionally movable combteeth set 1124 is to rotate about the second direction (Y-axis). The second second-directionally movable combteeth set 1124 is directly attached to the mirror 1040. The second second-directionally movable combteeth set 1124 is electrically connected to the mirror 1040. The four or more first-directional springs (For example, four springs 1140, 1142, 1150, and 1152 are shown.) are to rotate about the first direction (X-axis). The two or more second-directional springs (For example, two springs 1160 and 1162 are shown.) are to rotate about the second direction (Y-axis). The two or more second-directional springs (For example, two springs 1160 and 1162 are shown.) align along the second direction (Y-axis). In one embodiment, the components shown with hatched lines in FIG. 4A may be fabricated from a first layer of a wafer.

Figure 4B:
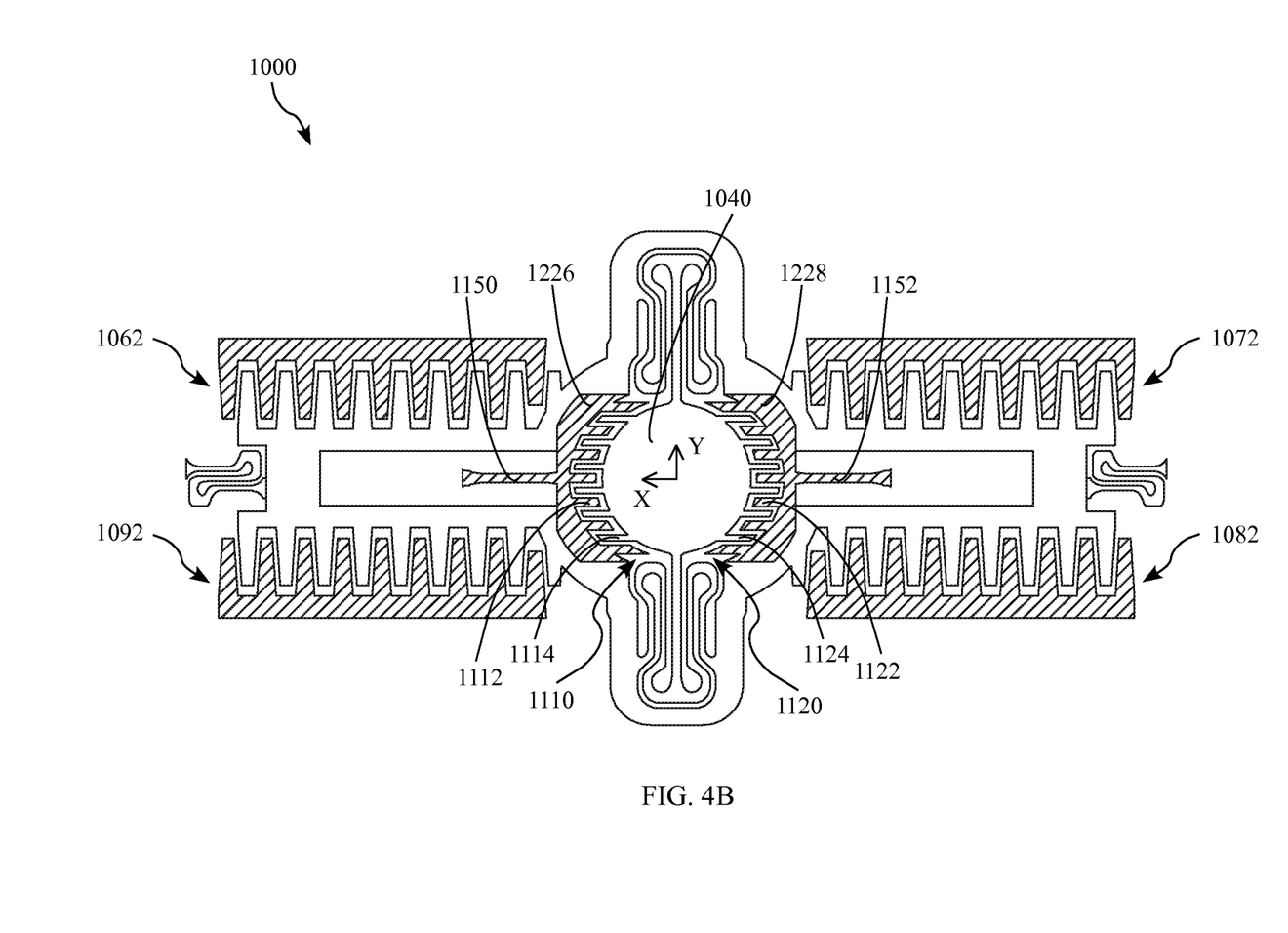
FIG. 4B shows the bottom view of the two-dimensional electrostatic scanner of FIG. 4A.

FIG. 4B shows the bottom view of the two-dimensional electrostatic scanner of FIG. 4A. The two-dimensional electrostatic scanner (switch) 1000 further comprises a first integration member 1226 and a second integration member 1228. The first relatively stationary combteeth set 1112 is directly attached to the first integration member 1226. The first inner spring 1150 is directly attached to the first integration member 1226. The second relatively stationary combteeth set 1122 is directly attached to the second integration member 1228. The second inner spring 1152 is directly attached to the second integration member 1228. In one embodiment, the components shown with hatched lines in FIG. 4B may be fabricated from a second layer and a third layer of a wafer. In one embodiment, the two or more second-directional comb drives (For example, two comb drives 1110 and 1120 are shown.) are vertical comb drives. The rotated position of the mirror 1040 may be adjusted in response to a capacitance value measured between the first relatively stationary combteeth set 1112 and the first second-directionally movable combteeth set 1114. The rotated position of the mirror 1040 may be adjusted in response to a capacitance value measured between the second relatively stationary combteeth set 1122 and the second second-directionally movable combteeth set 1124.

Figure 5A:
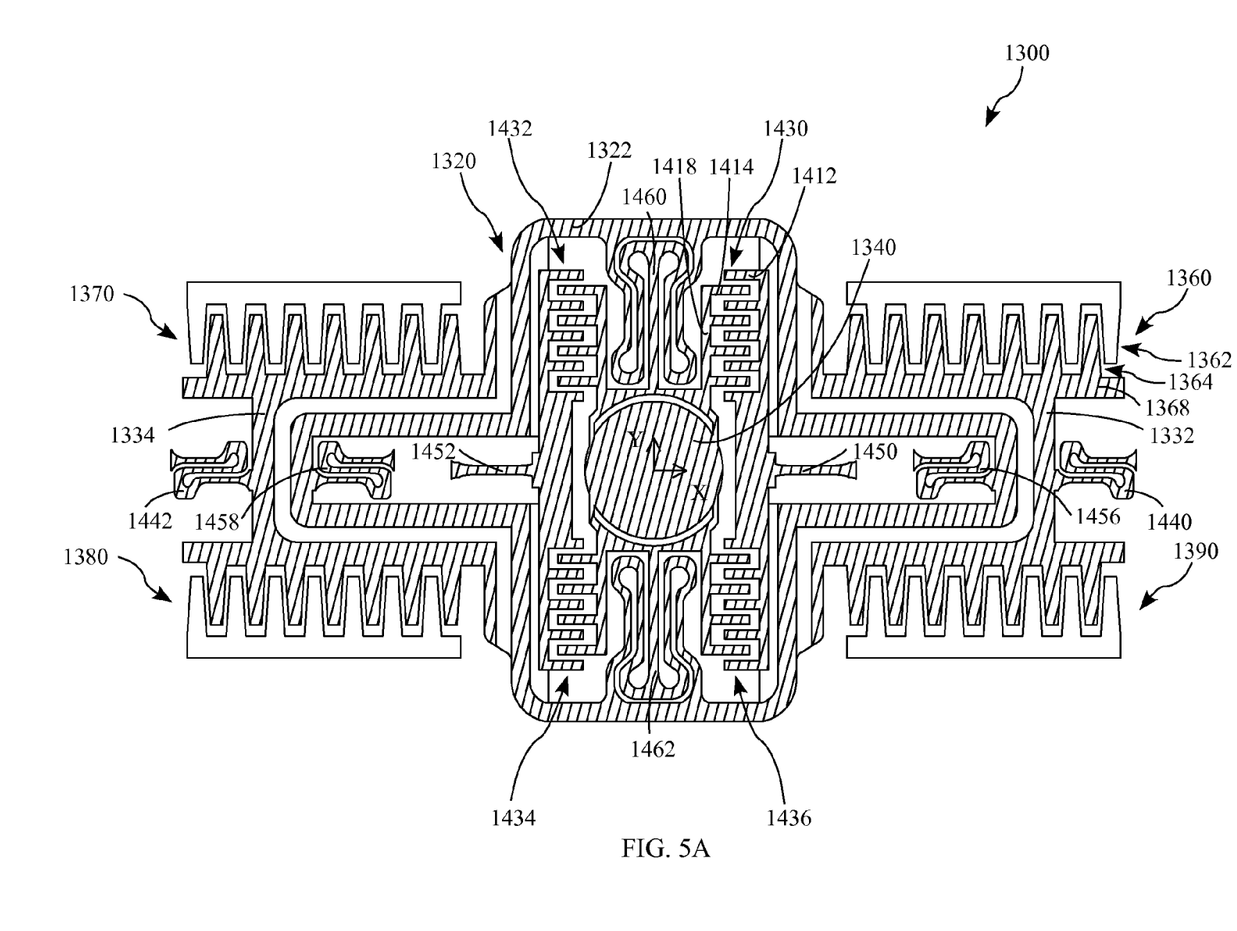
FIG. 5A shows a top view of a two-dimensional electrostatic scanner configured in accordance with another further embodiment of the present invention.

FIG. 5A shows a two-dimensional electrostatic scanner 1300 configured in accordance with another further embodiment of the present invention. The scanner 1300 comprises a frame 1320 to rotate about a first direction (X-axis), a mirror 1340 to rotate about a second direction (Y-axis), one or more first-directional comb drives (For example, four comb drives 1360, 1370, 1380, and 1390 are shown.), two or more second-directional comb drives (For example, four comb drives 1430, 1432, 1434, and 1436 are shown.), four or more first-directional springs (For example, first outer spring 1440, second outer spring 1442, first inner spring 1450, second inner spring 1452, first middle spring 1456, and second middle spring 1458 are shown.), and two or more second-directional springs (For example, two springs 1460 and 1462 are shown.). The frame 1320 includes a center-frame 1322, a first side-frame 1332, and a second side-frame 1334. The first side-frame 1332 is electrically isolated from the center-frame 1322. The second side-frame 1334 is electrically isolated from the center-frame 1322. The one or more first-directional comb drives (For example, four comb drives 1360, 1370, 1380, and 1390 are shown.) includes a first first-directional comb drive 1360. The first first-directional comb drive 1360 contains a first fixed combteeth set 1362 and a first first-directionally movable combteeth set 1364. The first first-directionally movable combteeth set 1364 is to rotate about the first direction (X-axis). The first first-directionally movable combteeth set 1364 is directly attached to the first side-frame 1332. The first first-directionally movable combteeth set 1364 is electrically connected to the first side-frame 1332. The first side-frame 1332 is electrically connected to the first outer spring 1440.

The two or more second-directional comb drives (For example, four comb drives 1430, 1432, 1434, and 1436 are shown.) includes a first second-directional comb drive 1430. The first second-directional comb drive 1430 contains a first relatively stationary combteeth set 1412 and a first second-directionally movable combteeth set 1414. The first second-directionally movable combteeth set 1414 is to rotate about the second direction (Y-axis). The first second-directionally movable combteeth set 1414 is indirectly attached to the mirror 1340 (For example, the first second-directionally movable combteeth set 1414 is directly attached to a first second-directional support member 1418 and the first second-directional support member 1418 is directly attached to the mirror 1340). The first second-directionally movable combteeth set 1414 is electrically connected to the mirror 1340. The first second-directionally movable combteeth set 1414 is electrically connected to the first middle spring 1456. In one embodiment, the components shown with hatched lines in FIG. 5A may be fabricated from a first layer of a wafer.

Figure 5B:
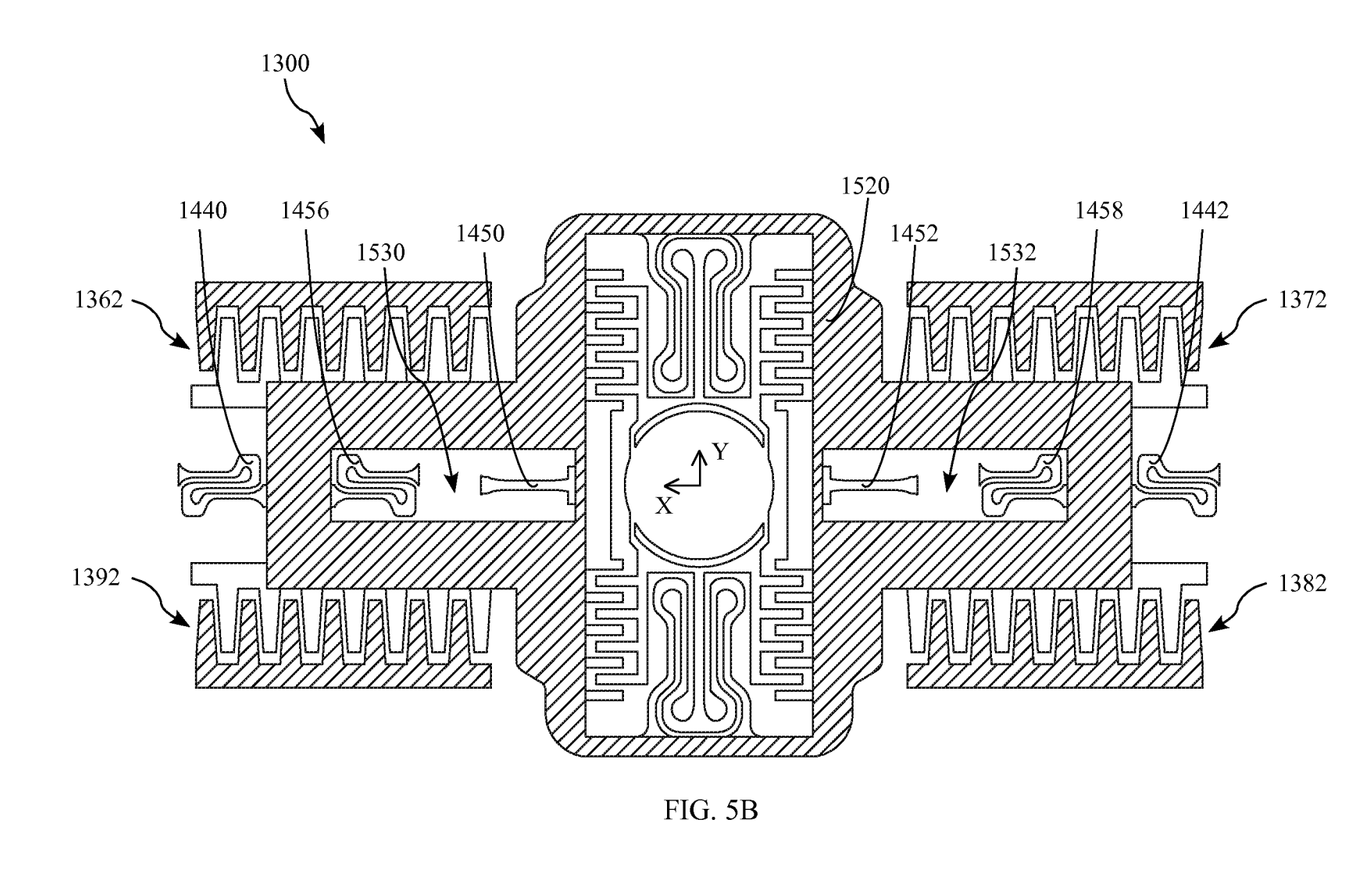
FIG. 5B shows the bottom view of the two-dimensional electrostatic scanner of FIG. 5A.

FIG. 5B shows the bottom view of the two-dimensional electrostatic scanner of FIG. 5A. The two-dimensional electrostatic scanner 1300 further comprises an integration ring 1520. In one embodiment, the integration ring 1520 has a first opening 1530 and a second opening 1532. The first middle spring 1456 and the first inner spring 1450 are located above the first opening 1530 and the second middle spring 1458 and the second inner spring 1452 are located above the second opening 1532. In one embodiment, the components shown with hatched lines in FIG. 5B may be fabricated from a second layer and a third layer of a wafer. For example, four fixed combteeth set 1362, 1372, 1382, and 1392 are shown in FIG. 5B. The fixed combteeth sets 1362, 1372, 1382, and 1392 and the integration ring 1520 may be fabricated from the second layer and the third layer of the wafer.

Those of ordinary skill in the art may recognize that modifications of the embodiments disclosed herein are possible. For example, the numbers of springs may vary; the springs may be linear springs, serpentine springs, or other kinds of springs; the numbers and the shapes of the openings in the frame near the springs may vary. Other modifications may occur to those of ordinary skill in this art, and all such modifications are deemed to fall within the purview of the present invention, as defined by the claims.

The invention claimed is:

1. A two-dimensional electrostatic scanner comprising:
a frame to rotate about a first direction;
a mirror to rotate about a second direction perpendicular to the first direction;
one or more first-directional comb drives including:
   a first first-directional comb drive containing:
      a first fixed combteeth set and
      a first first-directionally movable combteeth set to rotate about the first direction, the first first-directionally movable combteeth set being directly or indirectly attached to the frame;
two or more second-directional comb drives including:
   a first second-directional comb drive containing:
      a first relatively stationary combteeth set and
      a first second-directionally movable combteeth set to rotate about the second direction, the first second-directionally movable combteeth set being directly or indirectly attached to the mirror; and
   a second second-directional comb drive containing:
      a second relatively stationary combteeth set and
      a second second-directionally movable combteeth set to rotate about the second direction, the second second-directionally movable combteeth set being directly or indirectly attached to the mirror;

four or more first-directional springs to rotate about the first direction, the four or more first-directional springs aligning along the first direction and including:
- a first outer spring having a first end connected to the frame;
- a second outer spring having a first end connected to the frame;
- a first inner spring electrically connected to the first relatively stationary combteeth set; and
- a second inner spring electrically connected to the second relatively stationary combteeth set;

and two or more second-directional springs to rotate about the second direction, the two or more second-directional springs aligning along the second direction;

wherein the mirror and the frame are interconnected with the two or more second-directional springs;

wherein the first inner spring is located between the first outer spring and the mirror; and wherein the second inner spring is located between the second outer spring and the mirror.

2. The two-dimensional electrostatic scanner of claim 1, wherein the mirror, the two or more second-directional springs, the frame, the first and second outer springs, the first first-directionally movable combteeth set, and the first and second second-directionally movable combteeth set are electrically connected to ground; and wherein movable parts of the two-dimensional electrostatic scanner is symmetric with respect to the second direction.

3. The two-dimensional electrostatic scanner of claim 1, further comprising
- a first link member mechanically interconnecting the first inner spring and the first relatively stationary combteeth set, the first link member having a first link member bottom surface;
- a second link member mechanically interconnecting the second inner spring and the second relatively stationary combteeth set, the second link member having a second link member bottom surface; and
- an integration ring having a top ring surface;

wherein the frame has a frame bottom surface and wherein one portion of the top ring surface is bonded to a portion of the first link member bottom surface; another portion of the top ring surface is bonded to a portion of the second link member bottom surface; and still another portion of the top ring surface is bonded to a portion of the frame bottom surface.

4. The two-dimensional electrostatic scanner of claim 3, wherein the integration ring has a first opening and a second opening and wherein the first inner spring is located above the first opening and the second inner spring is located above the second opening.

5. The two-dimensional electrostatic scanner of claim 3, wherein the integration ring includes a top layer and a bottom layer and wherein the top layer is an electrical insulation layer.

6. The two-dimensional electrostatic scanner of claim 1, wherein the two-dimensional electrostatic scanner is symmetric with respect to the second direction.

7. The two-dimensional electrostatic scanner of claim 1, wherein the one or more first-directional comb drives are vertical comb drives.

8. The two-dimensional electrostatic scanner of claim 7, wherein the rotated position of the frame is adjusted in response to a capacitance value measured between the first fixed combteeth set and the first first-directionally movable combteeth set.

9. The two-dimensional electrostatic scanner of claim 1, wherein the two or more second-directional comb drives are vertical comb drives.

10. The two-dimensional electrostatic scanner of claim 9, wherein the rotated position of the mirror is adjusted in response to a capacitance value measured between the first relatively stationary combteeth set and the first second-directionally movable combteeth set.

11. The two-dimensional electrostatic scanner of claim 1, wherein the two or more second-directional comb drives are in-plane comb drives.

12. The two-dimensional electrostatic scanner of claim 1, wherein the mirror has a second-directionally rotational resonance frequency with a mode shape to rotate about the second direction and the mirror was driven to rotate back and forth about the second direction at a frequency close to the second-directionally rotational resonance frequency.

13. The two-dimensional electrostatic scanner of claim 1, further comprising a base;
- wherein the first outer spring having a second end connected to the base;
- the second outer spring having a second end connected to the base;
- the first inner spring having a first end connected to the base; and
- the second inner spring having a first end connected to the base.

14. The two-dimensional electrostatic scanner of claim 1, further comprising a first anchor, a second anchor, a third anchor, and a fourth anchor;
- wherein the first outer spring having a second end connected to the first anchor;
- the second outer spring having a second end connected to the second anchor;
- the first inner spring having a first end connected to the third anchor; and
- the second inner spring having a first end connected to the fourth anchor.

15. The two-dimensional electrostatic scanner of claim 1, wherein the four or more first-directional springs further include
- a first middle spring having one end connected to the frame and
- a second middle spring having one end connected to the frame;

wherein the first middle spring is located between the first outer spring and the first inner spring and the second middle spring is located between the second outer spring and the second inner spring.

16. The two-dimensional electrostatic scanner of claim 15, further comprising a first anchor, a second anchor, a third anchor, a fourth anchor, a fifth anchor, and a sixth anchor;
- wherein the first outer spring having a second end connected to the first anchor;
- the second outer spring having a second end connected to the second anchor;
- the first inner spring having a first end connected to the third anchor;
- the second inner spring having a first end connected to the fourth anchor;
- the first middle spring having a second end connected to the fifth anchor; and
- the second middle spring having a second end connected to the sixth anchor.

17. The two-dimensional electrostatic scanner of claim 1, wherein the frame has openings near the first or the second outer springs.

18. The two-dimensional electrostatic scanner of claim 1,
wherein the scanner has a second-directionally rotational resonance frequency with a mode shape to rotate about the second direction and a third-directionally rotational resonance frequency with a mode shape to rotate about the third direction perpendicular to the first and the second directions;
and
wherein the third-directionally rotational resonance frequency is between eighty-five percent and ninety-nine percent of the second-directionally rotational resonance frequency.

19. The two-dimensional electrostatic scanner of claim 1, wherein the first fixed combteeth set has a plurality of combteeth of rectangular prism shape or tapered shape and the first first-directionally movable combteeth set has a plurality of combteeth of rectangular prism shape or tapered shape.

20. The two-dimensional electrostatic scanner of claim 1,
wherein the first relatively stationary combteeth set has a plurality of combteeth of rectangular prism shape or tapered shape;
the first second-directionally movable combteeth set has a plurality of combteeth of rectangular prism shape or tapered shape;
the second relatively stationary combteeth set has a plurality of combteeth of rectangular prism shape or tapered shape; and
the second second-directionally movable combteeth set has a plurality of combteeth of rectangular prism shape or tapered shape.

21. The two-dimensional electrostatic scanner of claim 1, wherein the frame includes a center-frame, a first side-frame and a second side-frame;
wherein the four or more first-directional springs further include
a first middle spring having one end connected to the center-frame and
a second middle spring having one end connected to the center-frame;
wherein the first middle spring is located between the first outer spring and the first inner spring and
the second middle spring is located between the second outer spring and the second inner spring; and
wherein the first side-frame is electrically isolated from the center-frame;
the second side-frame is electrically isolated from the center-frame;
the first first-directionally movable combteeth set, the first side-frame, and the first outer spring are electrically connected; and
the first second-directionally movable combteeth set, the center-frame, and the first middle spring are electrically connected.

22. The two-dimensional electrostatic scanner of claim 21, wherein the first first-directionally movable combteeth set is electrically connected to a first ground pad and the first second-directionally movable combteeth set is electrically connected to a second ground pad.

* * * * *